G. E. HEINEY.
WHEEL RUNNER.
APPLICATION FILED SEPT. 4, 1912.

1,066,009.

Patented July 1, 1913.

Witnesses
H. L. Richey
Ba Brigden

Inventor
George E. Heiney
By John A. Bommhardt
Attorney

UNITED STATES PATENT OFFICE.

GEORGE E. HEINEY, OF CLEVELAND, OHIO.

WHEEL-RUNNER.

1,066,009.  Specification of Letters Patent.  Patented July 1, 1913.

Application filed September 4, 1912. Serial No. 718,534.

*To all whom it may concern:*

Be it known that I, GEORGE E. HEINEY, citizen of the United States, residing at Cleveland, in the county of Cuyahoga and State of Ohio, have invented certain new and useful Improvements in Wheel-Runners, of which the following is a specification.

This invention relates to wheel runners, particularly applicable to the wheels of automobiles, and has for its object to provide an improved runner which can be applied to an automobile wheel and which includes a shoe permitting the wheel to be used on snow and ice.

In use, the two front wheels of the automobile will be provided with runners, the rear wheels remaining as usual, for driving purposes.

The device is adapted to inclose the tire and securely attach the runner to the wheel.

Figure 1:
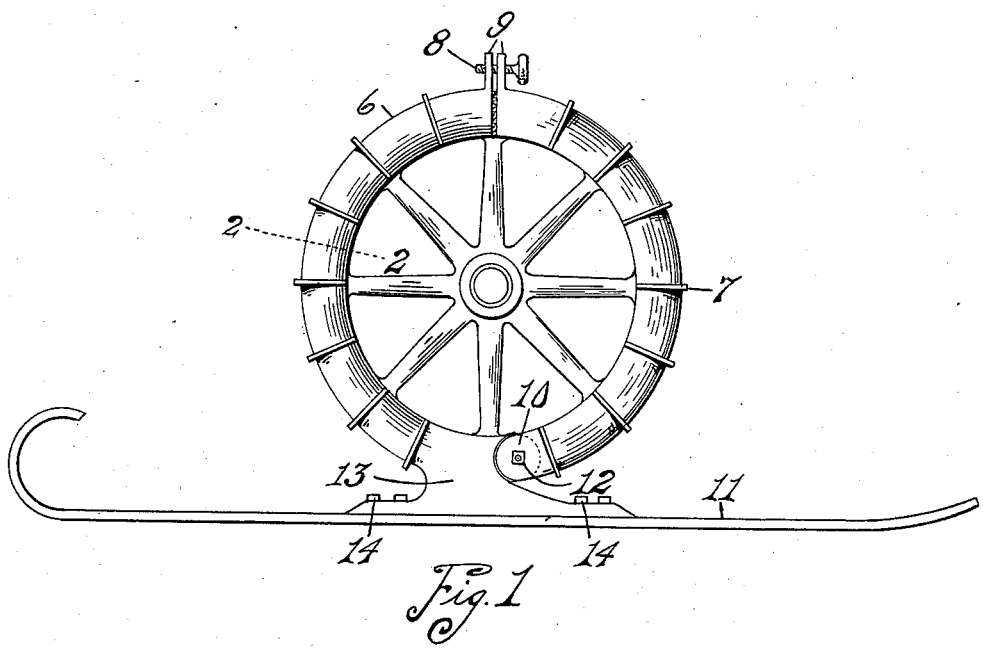
Figure 2:
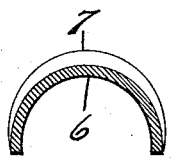
Figure 3:
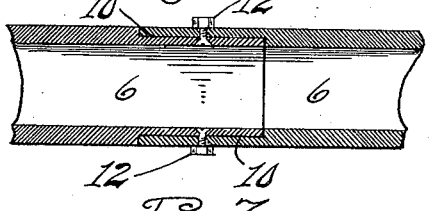

In the accompanying drawings—Figure 1 is a side elevation showing the wheel with the runner applied thereto. Fig. 2 is a section of the runner casing on the line 2—2 of Fig. 1. Fig. 3 is a detail of the joint between the sections of the casing.

Referring specifically to the drawings, 6 indicates two sections which when assembled will produce an annular casing. These sections are preferably made of sheet metal pressed to semi-circular form in cross section, so as to inclose the wheel tire which is held within the casing so formed. The casing has cross ribs 7 to strengthen the same, and the ends of the sections are joined together at the bottom by lap joint indicated at 10, formed by halving the lapped ends, which are connected together by bolts 12 which act as pivots to permit a limited movement, sufficient to open the sections, so that the wheel can be inserted therebetween. The upper ends of the sections are united by a screw 8 between flanges 9 on the respective sections, and by means of this screw the casing is clamped tightly on the tire or rim.

One section of the casing has a foot portion 13 preferably formed integral therewith, and to this foot portion the shoe 11 is attached, as by bolts 14, and the shoe runs on the surface of the snow or ice when the device is in use.

To attach or detach the runner the screw 8 is withdrawn and the casing is opened to permit the same to be placed on the wheel, after which the screw is tightened to clamp the parts against the rim of the wheel. Said rim fits between the flanges or in the channel of the casing, whereby lateral movement is effectively prevented and the casing is securely held on the wheel.

What I claim is:

A wheel runner comprising two curved channeled sections pivoted together by transverse pivots at one end, and connecting devices between the sections at the other end, and adapted to inclose a tire, and a shoe secured to one of said sections.

In testimony whereof, I do affix my signature in presence of two witnesses.

GEORGE E. HEINEY.

Witnesses:
JOHN A. BOMMHARDT,
ROBT. L. BLINCOE.

---

Copies of this patent may be obtained for five cents each, by addressing the "Commissioner of Patents, Washington, D. C."